(12) United States Patent
Roelen et al.

(10) Patent No.: US 11,747,644 B2
(45) Date of Patent: Sep. 5, 2023

(54) 3D DISPLAY APPARATUS

(71) Applicant: ULTRA-D COÖPERATIEF U.A., Eindhoven (NL)

(72) Inventors: Waltherus Antonius Hendrikus Roelen, Asten (NL); Herman Geert Marsman, Eindhoven (NL)

(*) Notice: Subject to any disclaimer, the term of this patent is extended or adjusted under 35 U.S.C. 154(b) by 181 days.

(21) Appl. No.: 17/238,004

(22) Filed: Apr. 22, 2021

(65) Prior Publication Data

US 2021/0240004 A1 Aug. 5, 2021

Related U.S. Application Data

(63) Continuation of application No. 16/067,984, filed as application No. PCT/EP2016/050018 on Jan. 4, 2016, now Pat. No. 11,106,049.

(51) Int. Cl.
*G02B 30/26* (2020.01)
*G02B 5/18* (2006.01)
(Continued)

(52) U.S. Cl.
CPC .............. *G02B 30/24* (2020.01); *G02B 30/26* (2020.01); *G02B 30/27* (2020.01); *G02B 30/36* (2020.01); *G02B 5/1866* (2013.01)

(58) Field of Classification Search
CPC ........ G02B 30/27; G02B 30/36; G02B 30/24; G02B 30/26; G02B 30/28; G02B 30/33;
(Continued)

(56) References Cited

U.S. PATENT DOCUMENTS 11,336,886 B2 * 5/2022 Wang .................. G02B 5/1819
2005/0046951 A1 3/2005 Sugihara et al.
(Continued)

FOREIGN PATENT DOCUMENTS

CN 102483604 A 5/2012
CN 104460115 A 3/2015
(Continued)

OTHER PUBLICATIONS

Shiroishi, T., et al., "3D Image Technique With a Grating Plate on High Resolution CRT," Optomechatronic Micro/Nano Devices and Components III: Oct. 8-10, 2007, Lausanne, Switzerland; [Proceedings of SPIE, ISSN 0277-786X], Spie, Bellingham, Wash, vol. 3012, Feb. 11, 1996, pp. 175-178, XP008022264.
(Continued)

*Primary Examiner* — Stephone B Allen
*Assistant Examiner* — Jyotsna V Dabbi
(74) *Attorney, Agent, or Firm* — Whitestone Law, PLLC

(57) ABSTRACT

A display apparatus is disclosed for enabling a user to experience a 3D perception when visual information is presented by the display apparatus. The display apparatus has an image forming unit having a two-dimensional array of image subpixels arranged to emit light for presenting associated visual information, and an optical system having an array of diffractive optical elements associated with respective ones of the array of image subpixels. Each diffractive optical element is arranged to diffract light from the associated image subpixel into a diffraction pattern with a plurality of diffraction orders to provide the visual information from the associated image subpixel to a plurality of directional viewing regions associated with the plurality of diffraction orders.

20 Claims, 7 Drawing Sheets

(51) Int. Cl.
*G02B 30/24* (2020.01)
*G02B 30/27* (2020.01)
*G02B 30/36* (2020.01)

(58) Field of Classification Search
CPC ...... G02B 30/00; G02B 30/20; G02B 5/1866; G02B 5/04; G02B 5/045; G02B 5/18; G02B 5/1814; G02B 5/1819; G02B 5/1823; G02B 5/1842; G02B 5/1847; G02B 5/189; G02B 26/0808; G02B 2005/1804; G02B 27/4272; G02B 30/22
USPC ........................................................ 359/463
See application file for complete search history.

(56) References Cited

U.S. PATENT DOCUMENTS

| | | | |
|---|---|---|---|
| 2010/0284082 A1* | 11/2010 | Shpunt | G02B 27/425 359/558 |
| 2011/0075259 A1* | 3/2011 | Shpunt | G02B 27/0944 359/566 |
| 2013/0033752 A1 | 2/2013 | Chen et al. | |
| 2014/0118226 A1 | 5/2014 | Gollier | |
| 2015/0253570 A1 | 9/2015 | Sunnari et al. | |

FOREIGN PATENT DOCUMENTS

| | | |
|---|---|---|
| KR | 10-2012-0115201 A | 10/2012 |
| KR | 10-2015-0134309 A | 12/2015 |
| TW | 201539040 A | 10/2015 |
| WO | WO2014/033699 A2 | 3/2014 |
| WO | 2016050619 A1 | 4/2016 |
| WO | 2016080908 A1 | 5/2016 |

OTHER PUBLICATIONS

International Search Report and Written Opinion for PCT Patent App. No. PCT/EP2016/050018 (dated Sep. 23, 2016).
International Preliminary Report on Patentability for PCT Patent App. No. PCT/EP2016/050018 (dated Nov. 23, 2017).
Cees van Berkel, David W Parker, Anthony R. Franklin, "Multiview 3D LCD", Proc. SPIE 2653, Stereoscopic Displays and Virtual Reality Systems III, Apr. 10, 1996, pp. 1-9.

* cited by examiner

3D DISPLAY APPARATUS

CROSS REFERENCE TO RELATED APPLICATION(S)

This application claims priority to and is a continuation patent application of U.S. patent application Ser. No. 16/067,984 filed on Jul. 3, 2018, which is a National Phase Filing under 35 C.F.R. § 371 of and claims priority to PCT Patent Application No. PCT/EP2016/050018, filed on Jan. 4, 2016, the contents of each of which are hereby incorporated in its entirety by reference.

BACKGROUND

Some embodiments relate to a display apparatus for enabling a user to experience a 3D perception when visual information is presented by the display apparatus.

Various related art display apparatuses exist for enabling a user to experience a 3D perception when visual information is presented by the display apparatus. Some related art systems may require the user to wear glasses to, for example, separate the visual information presented to the left eye from the visual information presented to the right eye. The inconvenience of the need to wear glasses may be overcome with so-called autostereoscopic systems. Some systems for 3D perception use lenticular lenses to spatially direct the visual information. An example of a lenticular system is described in C. van Berkel et al, "Multiview 3D-LCD" published in SPIE Proceedings Vol. 2653, 1996, pages 32 to 39.

SUMMARY

Other systems use parallax barriers. Some system approaches run into their design limits due to physical constraints. For example, some high-resolution small-size display systems may require lenticular lenses with a negative thickness. In some other systems, in particular with large display sizes, to allow the user to experience a high-quality 3D perception, a display apparatus using lenticular lenses or parallax barriers may need a significant distance between the lenticular lenses and the display panel with the two-dimensional array of image subpixels. Further, optical tolerances may require extra mechanical measures to define and maintain this distance, for example by using a solid transparent plate to provide the distance, which may lead to a significant increase in weight and cost. It would be advantageous to provide a display apparatus with better controllable design parameters, such as thickness, weight and cost.

Some embodiments are directed to a display apparatus for enabling a user to experience a 3D perception when visual information is presented by the display apparatus, wherein the display apparatus includes an image forming unit that includes a two-dimensional array of image subpixels and an optical system that includes an array of diffractive optical elements. The two-dimensional array of image subpixels is arranged to emit light for presenting associated visual information. The array of diffractive optical elements is associated with respective ones of the array of image subpixels. Each diffractive optical element is arranged to diffract light from the associated image subpixel into a diffraction pattern including a plurality of diffraction orders to provide the visual information from the associated image subpixel to a plurality of directional viewing regions associated with the plurality of diffraction orders. The optical system thereby effectively duplicates the visual information presented by one subpixel to a plurality of directional viewing regions as the visual information is provided to each of the plurality of diffraction orders, such that the user may experience a 3D perception in each one of the plurality of directional viewing regions. The diffractive optical element may, for example, be a diffractive grating. The diffractive optical element may be thin. The diffractive optical elements may provide visual information for experiencing 3D perception without the need for additional spatial separation that may be required in a display apparatus using conventional optics, such as lenticular lenses or parallax barriers, between the lenticular lenses or parallax barriers and the two-dimensional array if image subpixels in such systems. The display apparatus may thereby be thinner, lighter and/or cheaper.

In an embodiment, each diffractive optical element of the array of diffractive optical elements is arranged to diffract light from the associated image subpixel into the diffraction pattern including the plurality of diffraction orders according to a plurality of predefined intensity ratios between the diffraction orders. The relative intensities of each of the directional viewing regions may hereby be defined to, for example, provide a higher intensity for the directional viewing regions at the most common viewing positions, i.e., at the central viewing region.

In a further embodiment, the plurality of predefined intensity ratios corresponds to a gradual variation of intensity from a central to outer diffraction orders, the gradual variation corresponding to Lambert's cosine law, to provide the corresponding directional viewing regions with corresponding predefined intensity ratios.

In an embodiment, the plurality of directional viewing regions are restricted one or more predefined limited directional ranges.

For example, in an embodiment, the plurality of directional viewing regions are restricted to a predefined limited directional range. The diffractive optical elements may be designed such that the higher diffraction orders are suppressed. The predefined limited directional range may, e.g., correspond to an angular range in the horizontal plane of −60° to +60° or smaller, with 0° corresponding to the normal to the display apparatus. Restricting to the predetermined limited directional range may allow for an increased brightness of the visual information as provided to the plurality of directional viewing regions. The predefined limited directional range may, e.g., correspond to an angular range in the horizontal plane of −30° to +30° or smaller, with 0° corresponding to the normal to the display apparatus. Restricting to the predetermined limited directional range may alternatively or additionally restrict the use of the display apparatus to only the user in the predefined limited directional range, and provide a reduced disturbance of other people and/or prevent other people to view the visual information.

In an embodiment, the plurality of directional viewing regions are restricted to two predefined limited directional ranges. The diffractive optical elements may be designed such that central diffraction orders are suppressed. The two predefined limited directional range may, e.g., correspond to a first angular range in the horizontal plane of −45° to −15° or narrower and a second angular range in the horizontal plane of +15° to +45° or narrower, with 0° corresponding to the normal to the display apparatus. Restricting to two predetermined limited directional ranges may allow two spatially separated regions wherein a user can experience 3D perception, such as, e.g., a driver and a co-pilot in a car.

In some embodiments, each diffractive optical element is a diffractive grating. The grating pitch and shape may be designed to provide the wanted directions and intensity ratios of the diffraction orders of the diffraction pattern of the light emitted by the associated subpixel. The diffractive gratings may thus be arranged to provide the diffraction orders with the plurality of predefined intensity ratios.

In some embodiments, each diffractive optical element of the array of diffractive optical elements is arranged to diffract light from the associated image subpixel into the diffraction pattern including the plurality of diffraction orders, wherein adjacent non-suppressed diffraction orders of the plurality of diffraction orders associated with directional viewing regions are separated by one or more suppressed diffraction orders. Thus, the diffractive optical element does not diffract light into suppressed diffraction orders which are effectively not associated with respective visual information for directional viewing regions and diffraction orders which are associated with directional viewing regions. For example, every third diffraction order could be used for repeating visual information for directional viewing regions, with every two intermediate orders suppressed. This may allow additional design freedom for the diffractive optical element, such as additional design freedom in pitch and shape of diffractive gratings.

In some embodiments, the array of diffractive optical elements includes a plurality of subsets of diffractive optical elements. The diffractive optical elements of each subset of diffractive optical elements may be arranged to provide the diffraction pattern from the associated diffractive optical element with an associated predetermined subset direction. The predetermined subset directions of different subsets are different to provide the visual information from the image subpixels associated with the different subsets to the directional viewing regions at different directions, to enable the user to view with 3D perception in each of the plurality of directional viewing regions. The subsets of diffractive optical elements may thus provide visual information from subsets of associated subpixels to an associated plurality of different directions in each of the directional viewing regions. Each diffractive optical element may thus diffract the incoming light to provide the diffraction pattern, and provide the associated predetermined subset direction to the diffraction pattern.

In further embodiments, the diffractive optical elements of each subset of diffractive optical elements are arranged to provide the diffraction pattern from the associated diffractive optical element with an associated predetermined subset direction, adjacent diffraction orders of the plurality of diffraction orders associated directional viewing regions are separated by one or more suppressed diffraction orders, and the suppression is different for different subsets to provide the diffraction pattern from the associated diffractive optical element with the predetermined subset direction. Each diffractive optical element may thus diffract the incoming light to provide the diffraction pattern, and provide the associated predetermined subset direction to the diffraction pattern by suppression of diffraction orders in dependence of the predetermined subset direction for the associated subpixel.

In some embodiments, the optical system further includes an array of further optical elements associated with respective one or more diffractive optical elements of the array of diffractive optical elements. The array of further optical elements includes a plurality of subsets of further optical elements, the further optical elements of each subset of further optical elements being arranged to provide the diffraction pattern from the associated one or more diffractive optical elements with an associated predetermined subset direction. The predetermined subset directions of different subsets are different to provide the visual information from the image subpixels associated with the different subsets to the directional viewing regions at different directions, to enable the user to view with 3D perception in each of the plurality of directional viewing regions. The subsets of further optical elements may thus provide visual information from subsets of associated one or more subpixels to an associated plurality of different directions in each of the directional viewing regions. Using further optical elements next to the diffractive optical elements may facilitate design and/or manufacturing, and/or tolerances therein.

In some embodiments, the further optical elements of the different subsets of the array of further optical elements include respective further diffractive components arranged to provide the associated diffraction pattern with the corresponding predetermined subset direction. In some embodiments, the further diffractive optical components include, or are, blazed gratings. The blazed gratings may thus be arranged to provide the associated predetermined subset direction in an efficient manner.

In some embodiments, the further optical elements of the different subsets of the array of further optical elements include respective refractive optical components arranged to provide the associated diffraction pattern with the corresponding predetermined subset direction. In some embodiments, the refractive optical components include, or are, prisms. The refractive optical components may thus be arranged to provide the associated predetermined subset direction in an efficient manner. The refractive optical components may be relatively easy to handle. The prisms may for example be provided as a prism sheet.

The further optical elements may relate one to one to a subpixels. A single further optical element may relate to multiple subpixels, in particular to subpixels associated with a single full-color pixel or with adjacent subpixels corresponding to the same subset viewing direction.

In some embodiments, the diffractive optical elements and the further optical elements may be separate elements. In alternative embodiments, the diffractive optical element and the associated further optical element are integrated as a single optical element. For example, in embodiments, the diffractive optical elements of each subset of diffractive optical elements have respective diffractive surfaces and opposite surfaces, and the respective diffractive surfaces arranged to diffract light from the associated image subpixel into the diffraction pattern including the plurality of diffraction orders are arranged at a subset-specific angle with respect to the respective opposite surfaces, where the subset-specific angle is selected to provide the associated predetermined subset direction. The diffractive surfaces and opposite surfaces hereby form the refractive optical elements, integrated with the diffractive optical elements. Each diffractive optical element may thus diffract the incoming light to provide the diffraction pattern, and provide the associated predetermined subset direction to the diffraction pattern.

In some embodiments, the two-dimensional array of image subpixels is positioned in between the array of further optical components and the array of diffractive optical elements. In alternative embodiments, the array of further optical components is positioned in between the two-dimensional array of image subpixels and the array of diffractive optical elements. In some embodiments, the array of diffractive optical elements is positioned at a front side of the display apparatus, i.e., the side facing a user during use.

In some embodiments, the two-dimensional image forming unit is arranged for emitting light with a predefined angular intensity profile from the image subpixels of the two-dimensional array of image subpixels to the optical system. The diffractive optical components and/or the further optical components may be optimized for the predefined angular intensity profile. The predefined angular intensity profile may, e.g., correspond to a slightly divergent beam. The predefined angular intensity profile may relate to the profile in the direction corresponding to the assumed parallax of the user, thus in the horizontal plane. The vertical profile may be a diffuse, Lambertian, profile or any other suitable profile.

In some embodiments, the two-dimensional image forming unit is arranged for emitting light with the predefined angular intensity profile with a time-periodically varying angular profile direction and to provide associated visual information to the subpixels, to provide the visual information from the image subpixels associated with the different subsets to the directional viewing regions in periodically different directions, to enable the user to view with 3D perception in each of the plurality of directional viewing regions. For example, the display apparatus may have a time-sequentially directional backlight illuminating a transmissive LCD panel. The spatial resolution if the two-dimensional array of image subpixels may hereby be fully used. The number and/or complexity of optical components may be reduced.

In some embodiments, the array of diffractive optical elements is arranged to provide corresponding diffraction patterns for sets of image subpixels arranged to emit light with different colors to provide corresponding directional viewing regions associated with the plurality of diffraction orders of light with different colors. An enhanced or improved quality of visual information in each directional viewing region is thereby obtained.

It will be appreciated by those of ordinary skill in the art that two or more of the above-mentioned embodiments may be combined in any way deemed useful. Modifications and variations of the display apparatus, that correspond to the described modifications and variations of the display apparatus, can be carried out by a person of ordinary skill in the art on the basis of the present description. Some embodiments are defined in the independent claims. Advantageous options are defined in the dependent claims.

BRIEF DESCRIPTION OF THE FIGURES

These and other aspects of the presently disclosed subject matter are apparent from and will be elucidated with reference to the embodiments described hereinafter. In the drawings, FIG. 1 schematically shows a presentation of visual information by a display apparatus.

DETAILED DESCRIPTION OF EXEMPLARY EMBODIMENTS

Figure 1:
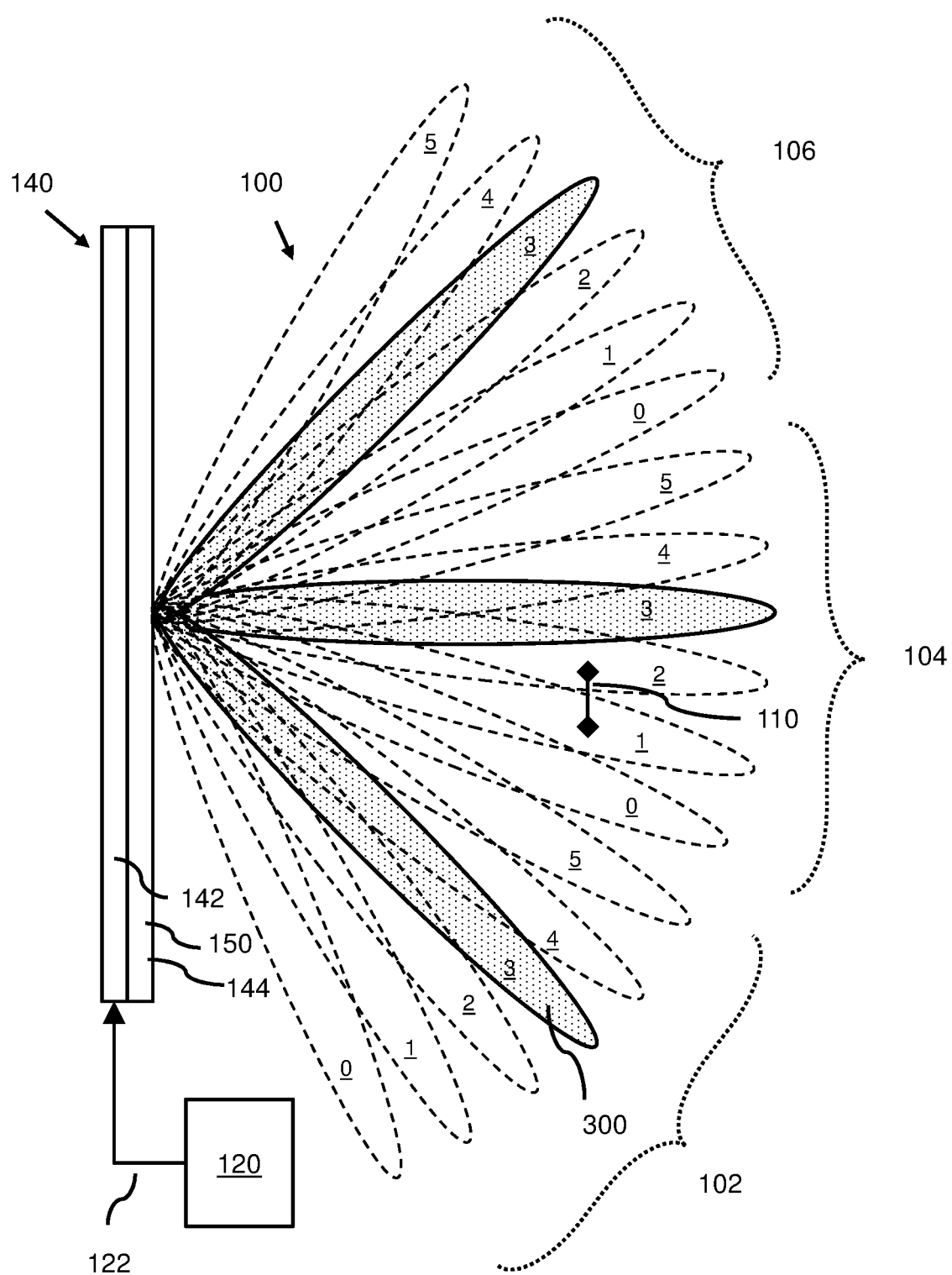

FIG. 1 schematically shows a presentation of visual information by a display apparatus 140. The display apparatus 140 can enable a user to experience a 3D perception when visual information is presented by the display apparatus 140. The display apparatus 140 includes an image forming unit 142 including a two-dimensional array of image subpixels (in later Figures shown as 142b) and an optical system 144 including an array of diffractive optical elements 150. The two-dimensional array of image subpixels is arranged to emit light for presenting associated visual information. The two-dimensional image forming unit 142 is arranged for emitting light with a predefined angular intensity profile from the image subpixels of the two-dimensional array of image subpixels to the optical system. In the example shown, the two-dimensional image forming unit 142 is arranged for emitting slightly divergent light. The array of diffractive optical elements 150 is associated with respective ones of the array of image subpixels. Each diffractive optical element is arranged to diffract light from the associated image subpixel into a diffraction pattern 300 including a plurality of diffraction orders to provide the visual information from the associated image subpixel to a plurality of directional viewing regions 102, 104, 106 associated with the plurality of diffraction orders. The image subpixels of the array of image subpixels are provided as image subpixels arranged to emit light of specific colors for groups of image subpixels, such as red, green and blue light. Image subpixels may be referred to by the color of the light they emit, e.g., as red subpixels, green subpixels and blue subpixels. Alternative colors may be, for example, red, green, blue and yellow light. The array of diffractive optical elements is arranged to provide corresponding diffraction patterns for sets of image subpixels arranged to emit light with different colors to provide corresponding directional viewing regions associated with the plurality of diffraction orders of light with different colors. The diffractive optical elements may be diffractive gratings. The diffractive gratings associated with the image subpixels of the same color may have the same grating pitch. Thus, all gratings associated with red subpixels may have a first grating pitch, all gratings associated with green subpixels may have a second pitch, and all gratings associated with blue subpixels may have a third pitch, wherein the first, second and third pitch are designed to provide the pluralities of diffraction orders for light of the different colors to the same plurality of directional viewing regions. The image subpixels are organized in subsets of image subpixels associated with different visual information representing different perspective. The image subpixels are hereto provided with an image signal 122 from an image processor 120. The image processor 120 is arranged to provide the subpixels with drive signals to allow visual information to be presented allowing a 3D perception. Each subset is associated with a subset of visual information associated with a subset direction, indicated as 0, 1, 2, 3, 4 and 5, within a directional viewing region. When the user's eyes are in neighboring subset-directions within a directional viewing region, e.g., as indicated with 110, the user may experience a 3D perception. The optical system may thus be said to effectively duplicate the visual information presented by one subpixel to a plurality of directional viewing regions 102, 104, 106 as the visual information is provided to each of the plurality of diffraction orders by the diffractive optical components. The duplication is indicated with the dotted area for subset direction number 3. The user may hereby experience a 3D perception in each one of the plurality of directional viewing regions 102, 104, 106. In the example shown, the number of diffraction orders schematically shown to be limited to three, with corresponding directional viewing regions 102, 104, 106, and a predetermined limited angular range covered by these directional viewing regions 102, 104, 106 and indicated as 100. The array of diffractive optical elements is arranged to diffract light from the associated image subpixel into the diffraction pattern including the plurality of diffraction orders according to a plurality of predefined intensity ratios between the diffraction orders. The optical system may effectively duplicate the visual information presented by one subpixel to the plurality of directional viewing regions 102, 104, 106 with predefined intensity ratios. Outer directional viewing regions, such as directional viewing regions 102, 106 in the example shown in FIG. 1, may, e.g., have intensity ratios according to a plurality predefined intensity ratios between the diffraction orders.

Figure 2:
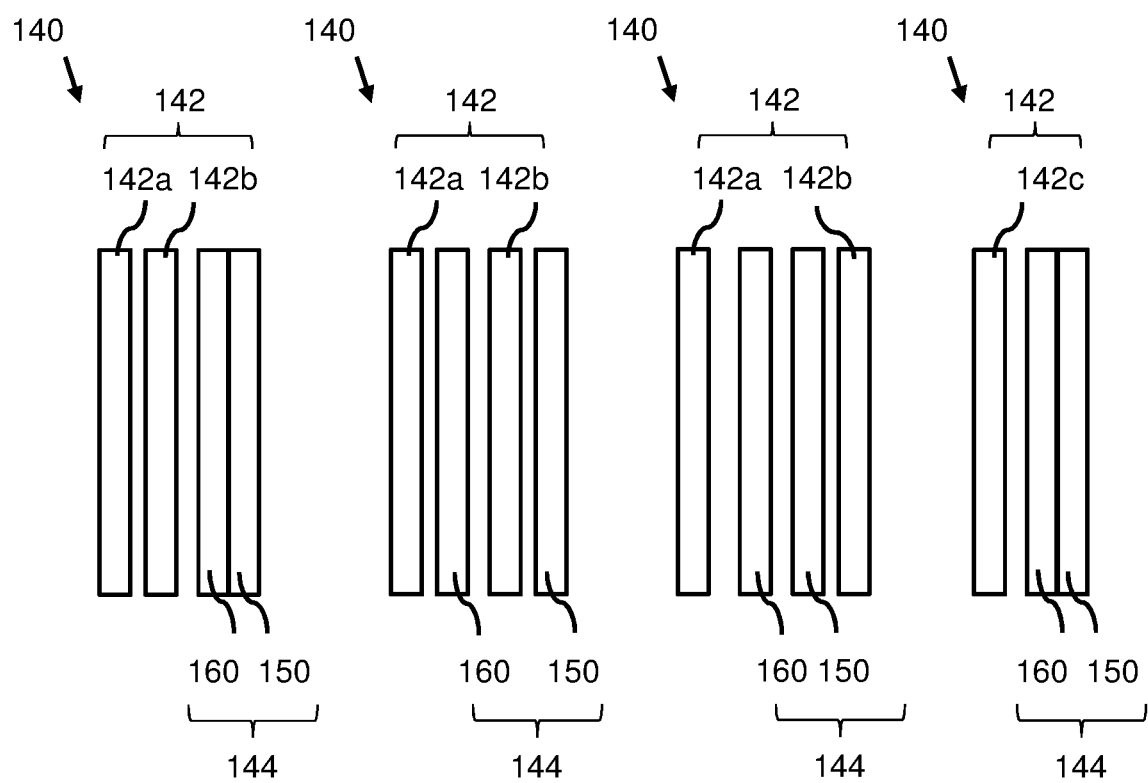
FIG. 2a-2d schematically show embodiments of a display apparatus.

FIG. 2a schematically shows a display apparatus 140 including an image forming unit 142 including a backlight 142a and a two-dimensional array of image subpixels 142b, and an optical system 144 including an array of diffractive optical elements 150 and an array of further optical elements 160. The array of further optical components is 160 positioned in between the two-dimensional array of image subpixels 142b and the array of diffractive optical elements 150, and is thereby arranged to provide the light emitted by image subpixels of subsets of the two-dimensional array of image subpixels 142b with a respective subset direction before the emitted light is "duplicated" by the diffractive optical element into the plurality of diffraction orders of the diffraction pattern. The diffractive optical element associated with a subpixel and the associated further optical element may integrated as a single optical element.

FIG. 2b schematically shows another display apparatus 140 including an image forming unit 142 including a backlight 142a and a two-dimensional array of image subpixels 142b, and an optical system 144 including an array of diffractive optical elements 150 and an array of further optical elements 160. The two-dimensional array of image subpixels 142b is positioned in between the array of further optical components 160 and the array of diffractive optical elements 150 and is thereby arranged to provide the emitted light with a respective subset direction to subsets of the two-dimensional array of image subpixels 142b, after which the light is emitted by image subpixels of the subsets of the two-dimensional array of image subpixels 142b with the respective subset direction before the light is "duplicated" by the diffractive optical element into the plurality of diffraction orders of the diffraction pattern.

FIG. 2c schematically shows again another display apparatus 140 including an image forming unit 142 including a backlight 142a and a two-dimensional array of image subpixels 142b, and an optical system 144 including an array of diffractive optical elements 150 and an array of further optical elements 160. The array of further optical components is 160 and the array of diffractive optical elements 15 are positioned in between the backlight 142a and the two-dimensional array of image subpixels 142b. The array of diffractive optical elements 15 is positioned at a close distance to the two-dimensional array of image subpixels 142b. In this arrangement, the array of further optical components is 160 and the array of diffractive optical elements 15 are arranged to provide the light emitted from the backlight 142a with a respective subset direction and to "duplicated" into the plurality of diffraction orders before the light is delivered to the image subpixels of subsets of the two-dimensional array of image subpixels 142b. The diffractive optical element associated with a subpixel and the associated further optical element may integrated as a single optical element.

FIG. 2d schematically shows again other display apparatus 140 including an image forming unit 142 including a two-dimensional array of emissive image subpixels 142c, and an optical system 144 including an array of diffractive optical elements 150 and an array of further optical elements 160. The array of further optical components is 160 positioned in between the two-dimensional array of image subpixels 142b and the array of diffractive optical elements 150, and is thereby arranged to provide the light emitted by image subpixels of subsets of the two-dimensional array of emissive image subpixels 142c with a respective subset direction before the light is "duplicated" by the diffractive optical element into the plurality of diffraction orders of the diffraction pattern. The diffractive optical element associated with a subpixel and the associated further optical element may be integrated as a single optical element. The image forming unit 142 including the two-dimensional array of emissive image subpixels 142c may be an organic LED display.

Figure 3:
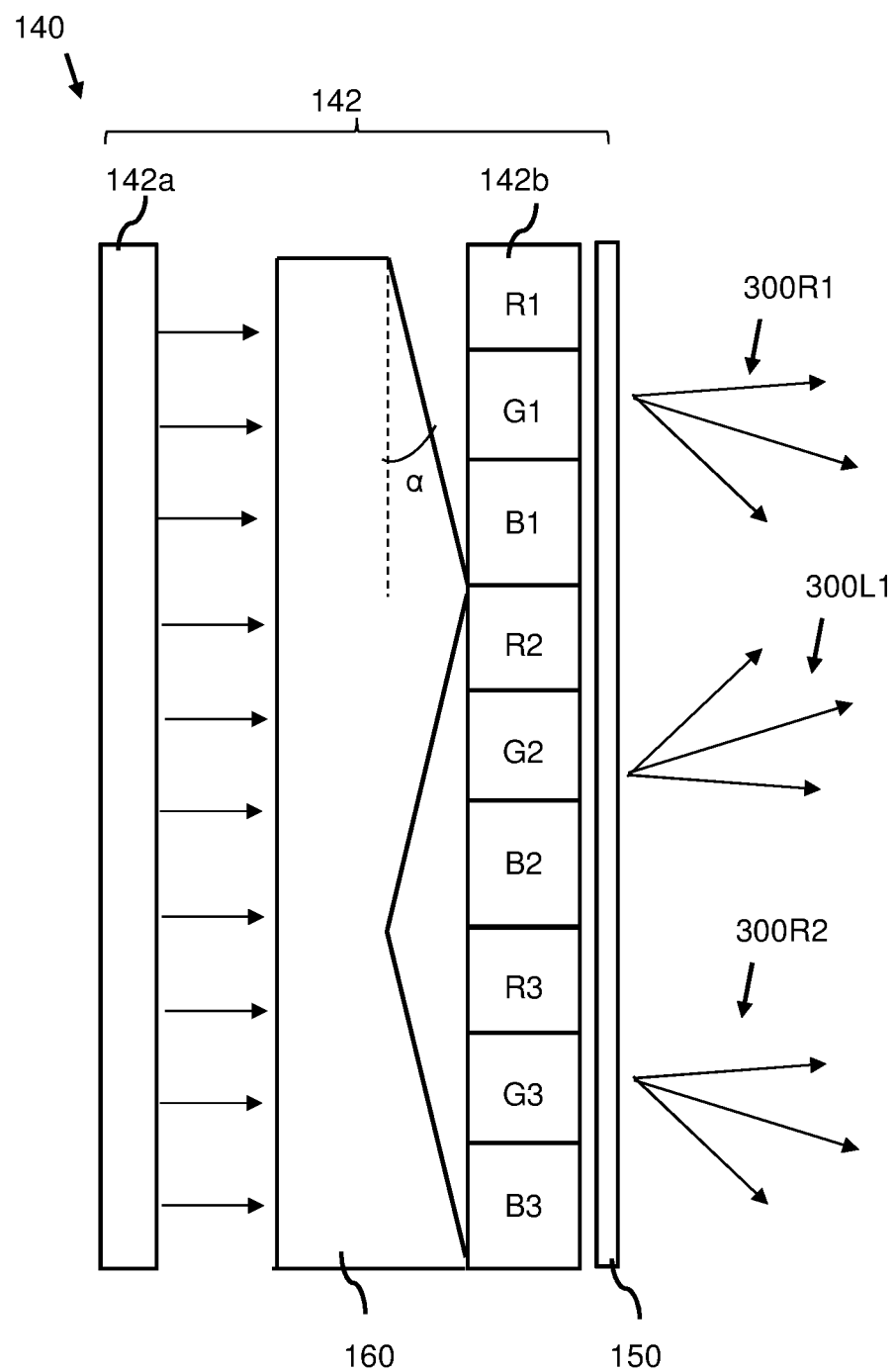
FIG. 3-6 schematically show details of various embodiments.

FIG. 3 schematically shows a simplified embodiment of a display apparatus 140 as shown in FIG. 2b. The display apparatus 140 includes an image forming unit 142 including a backlight 142a and a two-dimensional array of image subpixels 142b, and an optical system 144 including an array of diffractive optical elements 150 and an array of further optical elements 160. FIG. 3 schematically shows three image subpixels 300R1, 300L1, 300R2 together with the corresponding optics. The backlight 142a illuminates the array of further optical elements 160 with a substantially parallel beam. The two-dimensional array of image subpixels 142b is positioned in between the array of further optical components 160 and the array of diffractive optical elements 150 and is thereby arranged to provide the light with a respective subset direction to subsets of the two-dimensional array of image subpixels 142b, after which the light is emitted by image subpixels of the subsets of the two-dimensional array of image subpixels 142b with the respective subset direction before the light is "duplicated" by the diffractive optical element into the plurality of diffraction orders of the diffraction pattern. An array of further optical elements 160 is provided as a prism sheet to provide the light received from the backlight 142a in two subset directions to the two-dimensional array of image subpixels 142a. The prism sheet has a prism angle α of 3.6°. The prisms extend along a full pixel, including or consisting of three colored subpixels, in this example a red, green and blue subpixel. The prism sheet is in contact with the a two-dimensional array of image subpixels 142b with its prism tops. The array of diffractive optical elements 150 includes gratings having pitches of 5.2 μm, 4.4 μm and 3.6 μm for the red, green and blue subpixel respectively, to enable an optimal 3D perception at a viewing distance of 1 m. The array of diffractive optical elements 150 is designed to a plurality diffraction orders corresponding to a plurality directional viewing regions of predetermined luminous intensity ratios.

Figure 4:
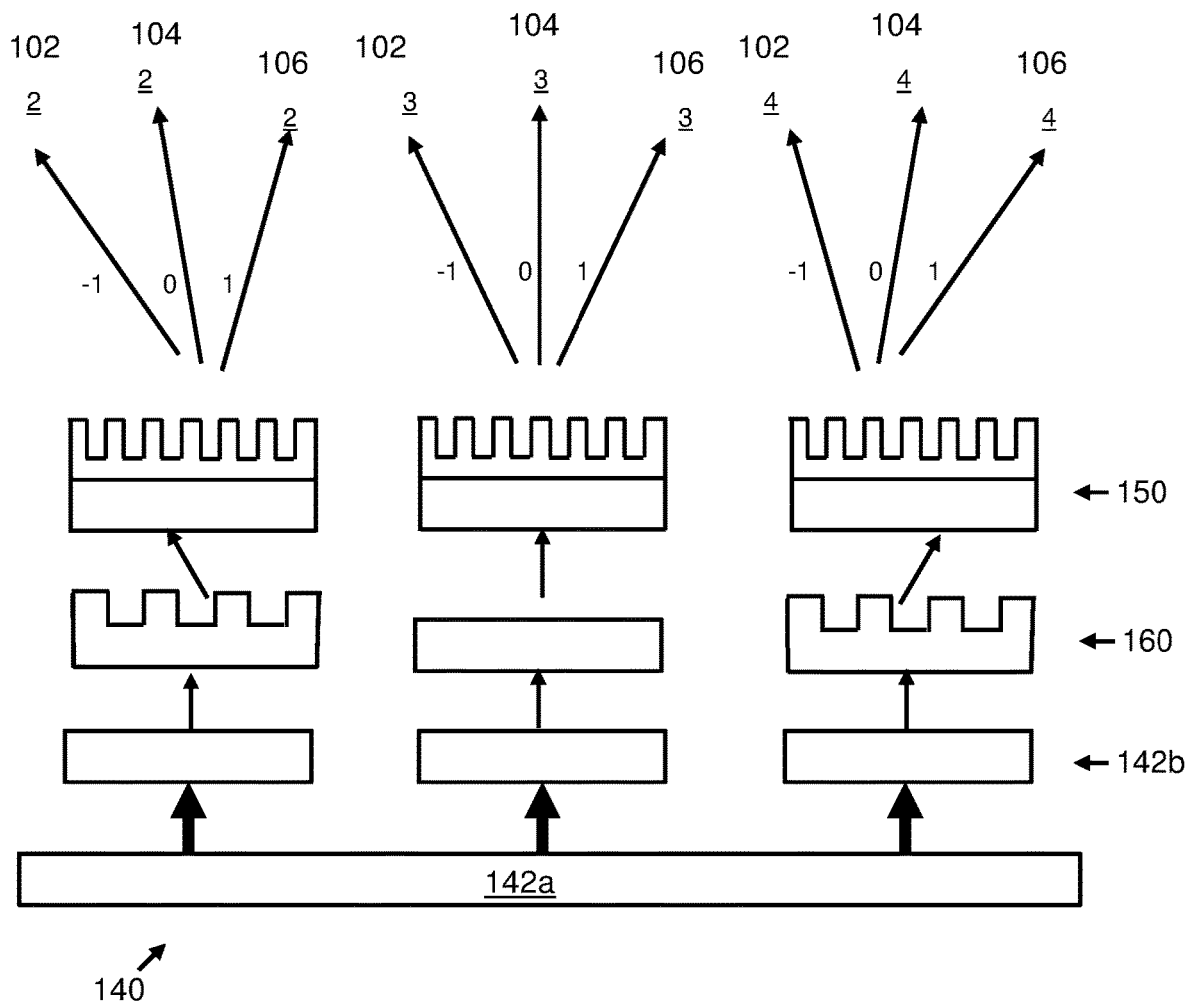

FIG. 4 schematically shows a presentation of visual information by a display apparatus 140 of an exemplary embodiment of the display apparatus 140 shown in FIG. 2a. The display apparatus 140 includes a directional backlight 142a and a two-dimensional array of image subpixels 142b, of which three subpixels are shown. The display apparatus 140 includes an array of diffractive optical elements 150, associated with respective ones of the array of image subpixels. Each diffractive optical element is arranged to diffract light from the associated image subpixel into a diffraction pattern. The display apparatus 140 includes an array of further optical elements 160 associated with respective diffractive optical elements of the array of diffractive optical elements 150. The array of further optical elements 160 includes a plurality of subsets of further optical elements. The further optical elements of each subset of further optical elements are arranged to provide the diffraction pattern from the associated one or more diffractive optical elements with an associated predetermined subset direction. The predetermined subset directions of different subsets are different to provide the visual information from the image subpixels associated with the different subsets to the directional viewing regions at different directions, to enable the user to view with 3D perception in each of the plurality of directional viewing regions. The further optical elements of the different subsets of the array of further optical elements 160 include respective further diffractive components arranged to provide the associated diffraction pattern with the corresponding predetermined subset direction. In the example shown, the further diffractive optical components are blazed gratings, arranged to provide the corresponding predetermined subset direction. FIG. 4 schematically shows three subpixels of the array of image subpixels. The three subpixels belong to three different subsets, corresponding to subset directions 2, 3 and 4 (refer to FIG. 1). The further diffractive optical components 160 provide the light emitted from the associated subpixels 142*b* with a subset direction and then emit the light to the associated diffractive optical element 150. As indicated, the three further diffractive optical components 160 shown each provide a different subset direction to the emitted light. The further diffractive components 160 associated with subpixels of the same subset and arranged to emit light of different colors are designed to provide equal subset directions. Each diffractive optical element 150 diffract lights from the associated image subpixel into a diffraction pattern including a plurality of diffraction orders indicated as −1, 0, 1, to provide the visual information from the associated image subpixel to a plurality of directional viewing regions 102, 104, 106 associated with the plurality of diffraction orders.

Figure 5:
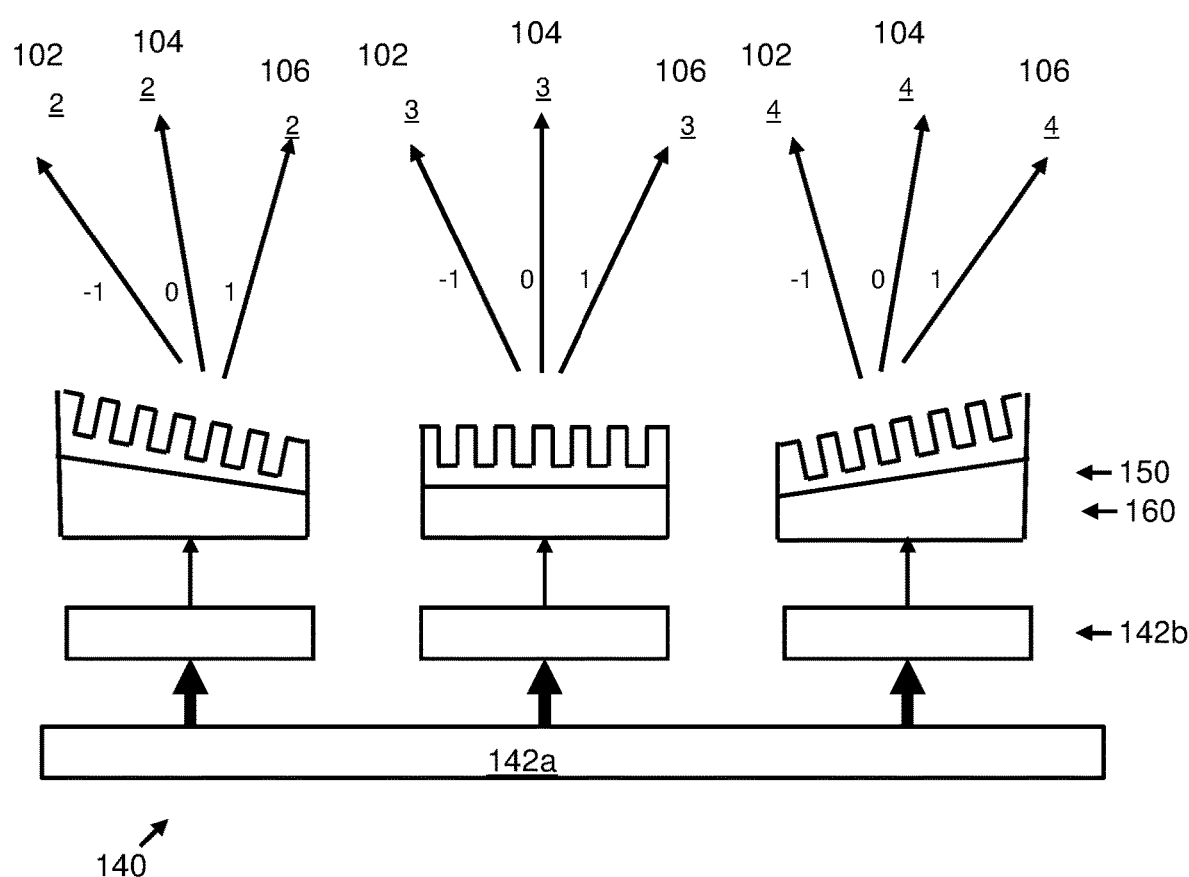

FIG. 5 schematically shows details of another embodiment. The embodiment of FIG. 5 differs from the embodiment of FIG. 4 at least in that the further optical elements 160 are not further diffractive optical components but refractive optical components arranged to provide the associated diffraction pattern with the corresponding predetermined subset direction. In the example shown, the refractive optical components are prisms, arranged to provide the corresponding predetermined subset direction. Thus, the refractive optical components 160 provide the light emitted from the associated subpixels 142*b* with a subset direction and then emit the light to the associated diffractive optical element 150. Each diffractive optical element 150 diffracts light from the associated image subpixel into a diffraction pattern including a plurality of diffraction orders indicated as −1, 0, 1, to provide the visual information from the associated image subpixel to a plurality of directional viewing regions 102, 104, 106 associated with the plurality of diffraction orders.

Figure 6:
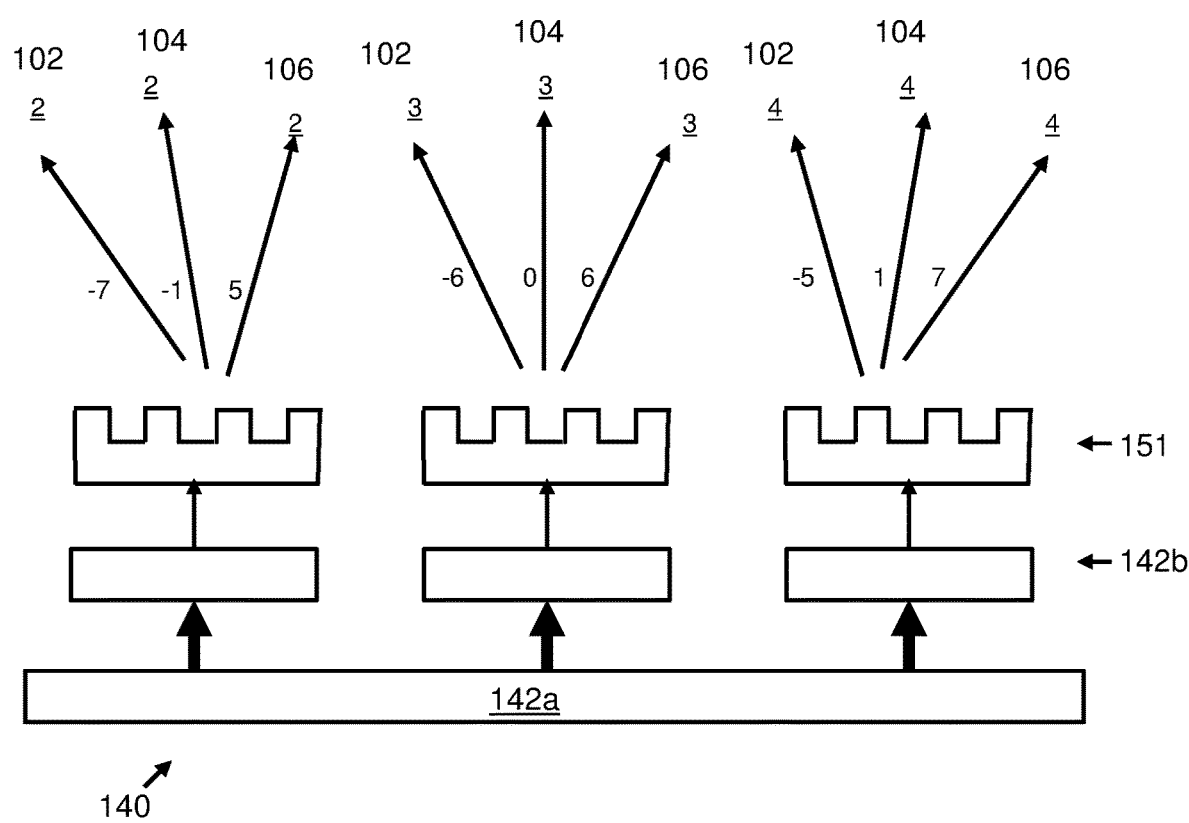

FIG. 6 schematically shows details of again another embodiment. In the embodiment shown in FIG. 6, the array of diffractive optical elements 151 is arranged to diffract light from the associated image subpixel into the diffraction pattern including the plurality of diffraction orders, wherein adjacent non-suppressed diffraction orders of the plurality of diffraction orders associated directional viewing regions are separated by one or more suppressed diffraction orders. In the schematic example of FIG. 6, five adjacent diffraction orders are suppressed and one out of six diffraction orders is used for visual information, where the suppression is dependent on the viewing direction associated with a subpixel. FIG. 6 shows the selective suppression in a schematic manner: three subpixels are associated with directions labelled 2, 3 and 4; the left diffractive optical element 151 is designed to diffract light from the associated image subpixel into a diffraction pattern including a plurality of diffraction orders indicated as −7, −1, 5 to provide the visual information from the associated image subpixel to a plurality of directional viewing regions 102, 104, 106 associated with the plurality of diffraction orders; the middle diffractive optical element 151 is designed to diffract light from the associated image subpixel into a diffraction pattern including a plurality of diffraction orders indicated as −6, 0, 6 to provide the visual information from the associated image subpixel to a plurality of directional viewing regions 102, 104, 106 associated with the plurality of diffraction orders; and the left diffractive optical element 151 is designed to diffract light from the associated image subpixel into a diffraction pattern including a plurality of diffraction orders indicated as −5, −1, 7 to provide the visual information from the associated image subpixel to a plurality of directional viewing regions 102, 104, 106 associated with the plurality of diffraction orders. The diffractive optical elements of each subset of diffractive optical elements is thus arranged to provide the diffraction pattern from the associated diffractive optical element with an associated predetermined subset direction, with the predetermined subset directions of different subsets being different to provide the visual information from the image subpixels associated with the different subsets to the directional viewing regions at different directions, to enable the user to view with 3D perception in each of the plurality of directional viewing regions. The suppression is different for different subsets to provide the diffraction pattern from the associated diffractive optical element with the predetermined subset direction.

Figure 7A:
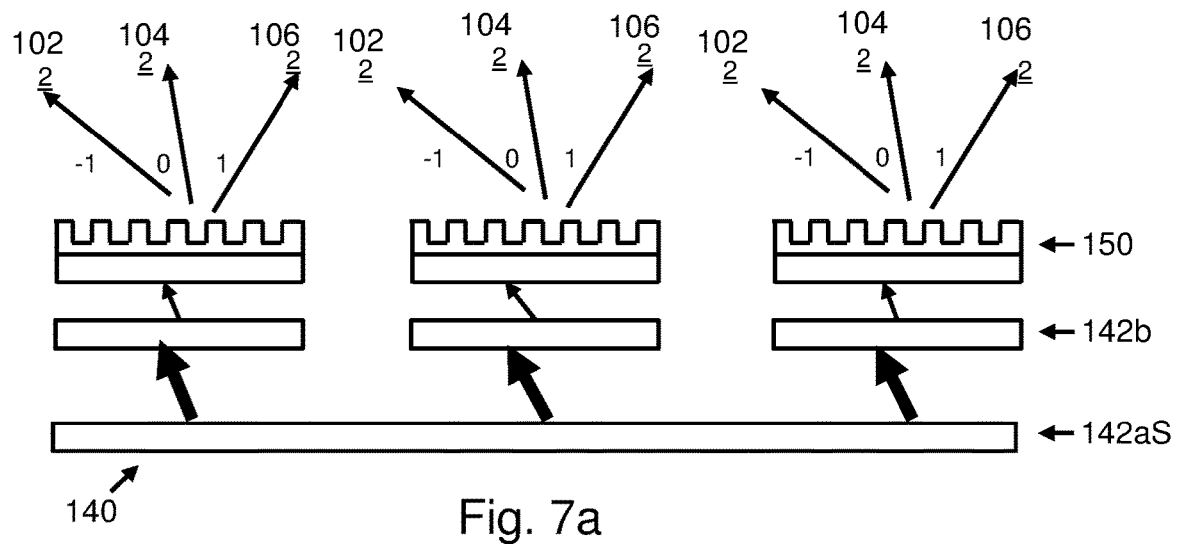
FIG. 7a-7c schematically shows details of another embodiment.
Figure 7B:
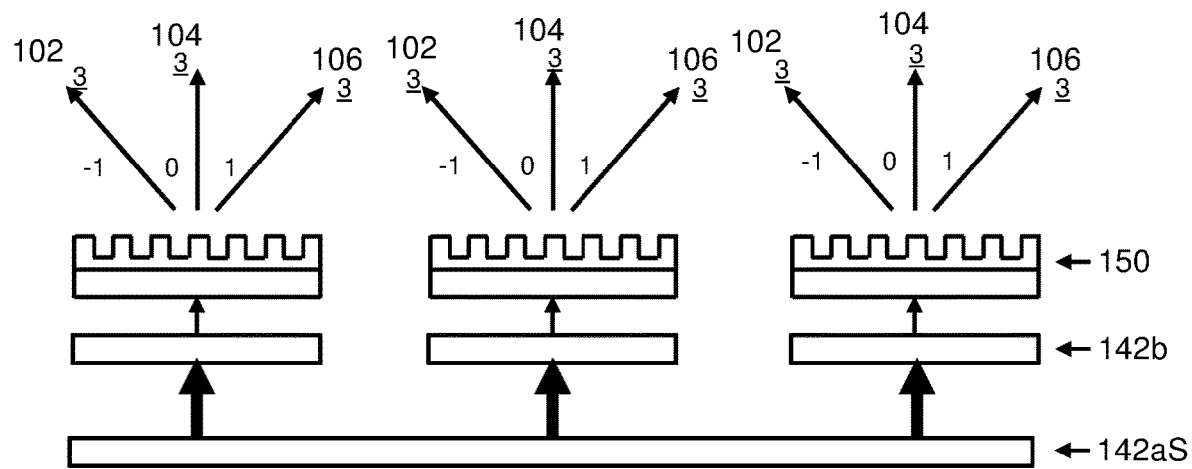
Figure 7C:
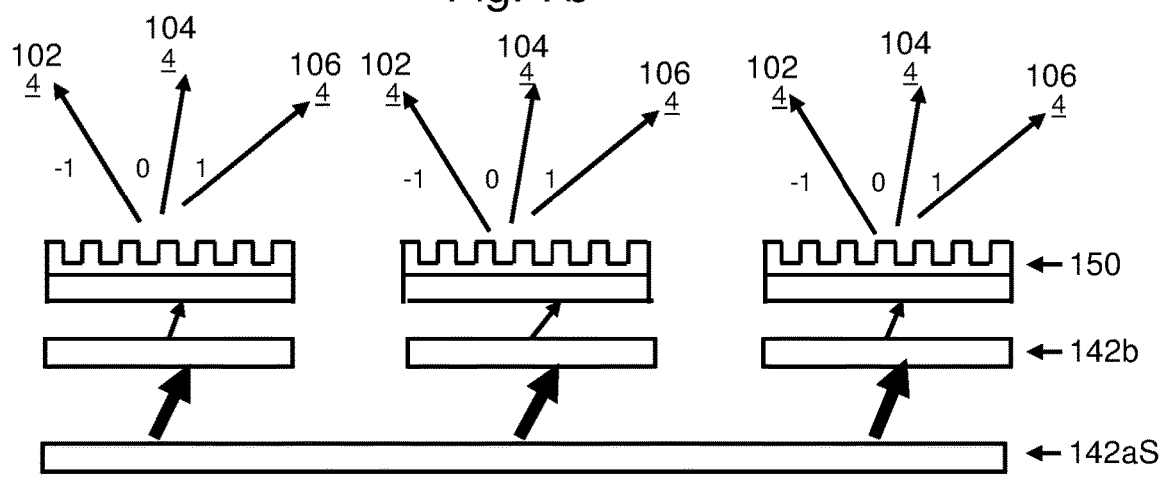

FIG. 7*a*-7*c* schematically shows details of again another embodiment. The display apparatus 140 shown on FIG. 7*a*-7*c* includes a time-sequential directional backlight 142*a*S and a two-dimensional array of image subpixels 142*b*, of which three subpixels are shown. The display apparatus 140 includes an array of diffractive optical elements 150, associated with respective ones of the array of image subpixels. Each diffractive optical element is arranged to diffract light from the associated image subpixel into a diffraction pattern. In the example shown, each diffractive optical element diffracts light into a diffraction pattern of three orders, −1, 0 and 1, and any other others are suppressed. The diffractive optical components thus provide the visual information from the associated image subpixel to a plurality of directional viewing regions 102, 104, 106 associated with the plurality of diffraction orders. The two-dimensional image forming unit 142 is arranged for emitting light with the predefined angular intensity profile with a time-periodically varying angular profile direction and to provide associated visual information to the subpixels 142*b* to provide the visual information from the image subpixels associated with the different subsets to the directional viewing regions in periodically different directions, to enable the user to view with 3D perception in each of the plurality of directional viewing regions.

FIG. 7*a*-7*c* show three successive moments in time. In FIG. 7*a*, the time-sequential directional backlight 142*a*S emits lights with a first predefined angular intensity profile having a first profile direction associated with viewing direction 2; in FIG. 7*b*, the time-sequential directional backlight 142*a*S emits lights with a second predefined angular intensity profile having a second profile direction associated with viewing direction 3, substantially perpendicular to the screen; in FIG. 7*c*, the time-sequential directional backlight 142*a*S emits lights with a third predefined angular intensity profile having a third profile direction associated with viewing direction 4. The viewing directions associated with the different profile directions are different to provide the visual information from the image subpixels associated with the different profile directions to the directional viewing regions at different directions, to enable the user to view with 3D perception in each of the plurality of directional viewing regions.

It should be noted that the above-mentioned embodiments illustrate rather than limit the presently disclosed subject matter, and that those of ordinary skill in the art will be able to design many alternative embodiments without departing from the scope of the appended claims. In the claims, any reference signs placed between parentheses shall not be construed as limiting the claim. Use of the verb "include" and its conjugations does not exclude the presence of elements or steps other than those stated in a claim. The article "a" or "an" preceding an element does not exclude the presence of a plurality of such elements. Some embodiments may be implemented by hardware including several distinct elements, and by a suitably programmed computer. In the device claim enumerating several methods, several of these methods may be embodied by one and the same item of hardware. The mere fact that certain measures are recited in mutually different dependent claims does not indicate that a combination of these measures cannot be used to advantage.

The invention claimed is:

1. A display apparatus for enabling a user to experience a 3D perception in a plurality of directional viewing regions when visual information is presented by the display apparatus, the display apparatus comprising:
    an image forming unit that includes a two-dimensional array of image subpixels arranged to emit light for presenting associated visual information, and
    an optical system that includes an array of diffractive optical elements associated with respective ones of the array of image subpixels,
    each diffractive optical element being arranged to diffract light from the associated image subpixel into a diffraction pattern including a plurality of diffraction orders to provide the visual information from the associated image subpixel to a plurality of directional viewing regions associated with the plurality of diffraction orders, so as to effectively duplicate the visual information presented by the associated image subpixel to each of the plurality of directional viewing regions,
    the array of diffractive optical elements including a plurality of subsets of diffractive optical elements,
    the diffractive optical elements of each subset of diffractive optical elements being arranged to provide the diffraction patterns from the diffractive optical elements of the subset with an associated predetermined subset direction,
    the predetermined subset directions of different subsets of diffractive optical elements being different so as to enable separation of visual information to be presented to the left eye of the user from visual information to be presented to the right eye of the user to enable the user to view with 3D perception,
    the array of diffractive optical elements thus being arranged to provide the visual information from the image subpixels associated with the diffractive optical elements of the different subsets to each of the directional viewing regions at the associated predetermined different subset directions within each of the plurality of directional viewing regions so as to enable the user to view with 3D perception in each of the plurality of directional viewing regions.

2. The display apparatus according to claim 1, wherein each diffractive optical element of the array of diffractive optical elements is arranged to diffract light from the associated image subpixel into the diffraction pattern including the plurality of diffraction orders, wherein adjacent non-suppressed diffraction orders of the plurality of diffraction orders associated with the directional viewing regions are separated by one or more suppressed diffraction orders.

3. The display apparatus according to claim 2, wherein the suppression is different for different subsets to provide the diffraction pattern from the associated diffractive optical element with the predetermined subset direction.

4. The display apparatus according to claim 3, wherein each diffractive optical element of the array of diffractive optical elements is arranged to diffract light from the associated image subpixel into the diffraction pattern including the plurality of diffraction orders according to a plurality of predefined intensity ratios between the diffraction orders.

5. The display apparatus according to claim 3, wherein the plurality of directional viewing regions are restricted to one or more predefined limited directional ranges.

6. The display apparatus according to claim 3, wherein each diffractive optical element is a diffractive grating.

7. The display apparatus according to claim 3, the two-dimensional image forming unit being arranged for emitting light with a predefined angular intensity profile from the image subpixels of the two-dimensional array of image subpixels to the optical system.

8. The display apparatus according to claim 2, wherein each diffractive optical element of the array of diffractive optical elements is arranged to diffract light from the associated image subpixel into the diffraction pattern including the plurality of diffraction orders according to a plurality of predefined intensity ratios between the diffraction orders.

9. The display apparatus according to claim 2, wherein the plurality of directional viewing regions are restricted to one or more predefined limited directional ranges.

10. The display apparatus according to claim 2, wherein each diffractive optical element is a diffractive grating.

11. The display apparatus according to claim 2, the two-dimensional image forming unit being arranged for emitting light with a predefined angular intensity profile from the image subpixels of the two-dimensional array of image subpixels to the optical system.

12. The display apparatus according to claim 1, wherein each diffractive optical element of the array of diffractive optical elements is arranged to diffract light from the associated image subpixel into the diffraction pattern including the plurality of diffraction orders according to a plurality of predefined intensity ratios between the diffraction orders.

13. The display apparatus according to claim 12, wherein the plurality of directional viewing regions are restricted to one or more predefined limited directional ranges.

14. The display apparatus according to claim 12, wherein each diffractive optical element is a diffractive grating.

15. The display apparatus according to claim 1, wherein the plurality of directional viewing regions are restricted to one or more predefined limited directional ranges.

16. The display apparatus according to claim 15, wherein each diffractive optical element is a diffractive grating.

17. The display apparatus according to claim 1, wherein each diffractive optical element is a diffractive grating.

18. The display apparatus according to claim 1, the two-dimensional image forming unit being arranged for emitting light with a predefined angular intensity profile from the image subpixels of the two-dimensional array of image subpixels to the optical system.

19. The display apparatus according to claim 18, the two-dimensional image forming unit being arranged for emitting light with the predefined angular intensity profile with a time-periodically varying angular profile direction and to provide associated visual information to the subpixels to provide the visual information from the image subpixels associated with the different subsets to the directional viewing regions in periodically different directions, to enable the user to view with 3D perception in each of the plurality of directional viewing regions.

20. The display apparatus according to claim 1, the array of diffractive optical elements being arranged to provide corresponding diffraction patterns for sets of image subpixels arranged to emit light with different colors to provide corresponding directional viewing regions associated with the plurality of diffraction orders of light with different colors.

* * * * *